United States Patent

Ng

(10) Patent No.: US 8,475,154 B2
(45) Date of Patent: Jul. 2, 2013

(54) FLOWER POT MOLD FOR BLOW MOLDING

(75) Inventor: Sun Tat Ng, Hong Kong (HK)

(73) Assignee: Nadfinlo Plastics Industry Co., Ltd., Hong Kong (HK)

( * ) Notice: Subject to any disclaimer, the term of this patent is extended or adjusted under 35 U.S.C. 154(b) by 292 days.

(21) Appl. No.: 13/043,489

(22) Filed: Mar. 9, 2011

(65) Prior Publication Data

US 2011/0236523 A1    Sep. 29, 2011

(30) Foreign Application Priority Data

Mar. 26, 2010 (CN) .................. 2010 2 0142283 U

(51) Int. Cl.
*B29C 49/50* (2006.01)
*B29C 49/54* (2006.01)

(52) U.S. Cl.
USPC ................. 425/525; 425/527; 425/532

(58) Field of Classification Search
CPC .................................. B29C 49/4815
USPC ......... 425/522, 525, 527, 532, 541; 264/531, 264/534
See application file for complete search history.

(56) References Cited

U.S. PATENT DOCUMENTS

| | | | | |
|---|---|---|---|---|
| 3,004,285 A | * | 10/1961 | Hagen | 425/541 |
| 4,972,963 A | * | 11/1990 | Guarriello et al. | 264/531 |
| 5,026,268 A | * | 6/1991 | Lee | 425/525 |
| 5,253,996 A | * | 10/1993 | Moore | 425/525 |
| 6,074,596 A | * | 6/2000 | Jacquet | 425/525 |
| 6,383,440 B1 | * | 5/2002 | Chen | 264/531 |
| 2005/0170035 A1 | * | 8/2005 | Chen | 425/525 |

* cited by examiner

*Primary Examiner* — Robert B Davis

(57) ABSTRACT

The present patent application provides a flower pot mold for blow molding. The mold can reduce the number of the sliding blocks that need to be moved, and utilize the motion of a single sliding block to mold a flower pot so as to improve the manufacturing efficiency and the product quality. The mold includes a flower pot cavity template; a container opening pulling mold; a plurality of opening flanged pulling plates, a blowing tube being disposed in the container opening pulling mold; a fixing plate configured for fixing the mold onto a clamping set; a guiding block configured for guiding the opening flanged pulling plate and a blocking plate; and the blocking plate configured for blocking the plastics. A sliding track is formed on the flower pot cavity template and configured for allowing the blocking plate to move back and forth.

7 Claims, 4 Drawing Sheets

FLOWER POT MOLD FOR BLOW MOLDING

CROSS-REFERENCE

This application claims the benefit of Chinese Patent Application No. 201020142283.0, filed on Mar. 26, 2010, which is hereby incorporated by reference.

FIELD OF THE PATENT APPLICATION

The present patent application relates to a mold and more particularly to a mold for manufacturing plastic containers.

BACKGROUND

In modern lives, no matter in homes or offices, people have higher and higher requirements on the environment, demanding the environment to be more and more beautiful. The demand for flower pots has increased as well, toward fashion and environmental friendliness. Flower pots manufactured by blow molding are brought to meet such demand. These flower pots are different from the flower pots manufactured by other ways and have advantages such as being lightweight, convenient, environment friendly, nice-looking, durable and etc. In addition, in terms of structure, such flower pots have stable support from the bottom, and a flanged handle on the top so as to be easy to move.

Currently, plastic flower pots are mainly manufactured by multi-slide molds with multiple sliding motions. The process for manufacturing flower pots with such molds is relatively complicated and not convenient. The products manufactured in this way, as being formed by multiple sliding motions, often have marks of being connected together on the appearance.

The whole flower pot is not in a completely integrated piece, and hence appears to lack aesthetic feel.

SUMMARY

An object of the present patent application is to provide a flower pot mold for blow molding. The mold can reduce the number of the sliding blocks that need to be moved, and utilize the motion of a single sliding block to mold a flower pot so as to improve the manufacturing efficiency and the product quality.

To achieve the above object, the present patent application provides a flower pot mold for blow molding. The mold includes a flower pot cavity template; a container opening pulling mold; a plurality of opening flanged pulling plates, a blowing tube being disposed in the container opening pulling mold; a fixing plate configured for fixing the mold onto a clamping set; a guiding block configured for guiding the opening flanged pulling plate and a blocking plate; and the blocking plate configured for blocking the plastics. A sliding track is formed on the flower pot cavity template and configured for allowing the blocking plate to move back and forth. The sliding track is disposed at an inner side of the guiding block. The blocking plate is in contact with the inner side wall of the guiding block and can be inserted into the sliding track and slide along the sliding track. The opening flanged pulling plate is fixedly connected to an outer side of the blocking plate. The container opening pulling mold is disposed between the two opening flanged pulling plates.

Preferably, the guiding block and the fixing plate are connected into one piece.

Preferably, a protrusion with the same length as the depth of the container is disposed at the front end of the container opening pulling mold. This protrusion can function to limit the procession of the container opening pulling mold, and prevent the flanged handle from being cut off due to excessive procession when the opening flanged pulling plates and the container cavity template are closed.

Preferably, the protrusion is a pair of pole shaped rods.

Preferably, the protrusion is a hollow cylinder. When the pressure in the blowing tube is decreased, a negative pressure is formed in the cavity of the flower pot so that the flower pot is sucked at the front end of the cylinder, which prevents the flower pot from falling off from the container opening pulling mold when the mold is opened.

Preferably, the upper opening of the container cavity template and the opening flanged pulling plates work together to form a mold cavity of a flanged handle of a flower pot.

The present patent application has the following advantages.

Comparing with the current technology, according to the present patent application, the blow molding of the flower pot is realized by pushing the opening flanged pulling plates so that the blocking plate is moved to a stopping position at the bottom of the sliding track. The processes of closing mold and opening mold are simplified and the manufacturing efficiency is improved. The flower pots manufactured by the mold are in a completely integrated piece and nice-looking on the appearance, and have more stable quality.

BRIEF DESCRIPTIONS OF THE DRAWINGS

DETAILED DESCRIPTION

The present patent application provides a flower pot mold for blow molding.

Figure 1:
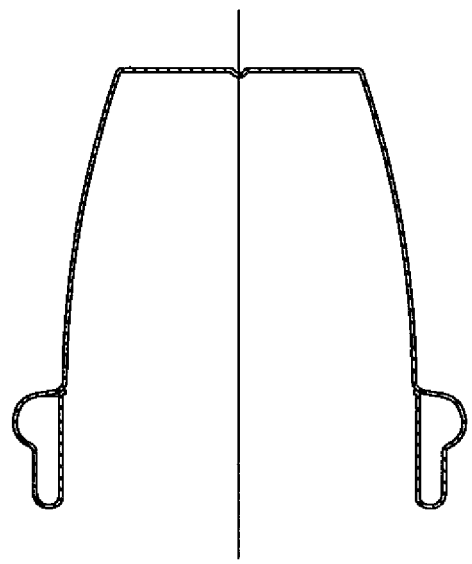
FIG. 1 illustrates the structure of a flower pot product.

FIG. 1 illustrates the outside appearance of the flower pot. A full round handle is formed at the opening of the flower pot.

Figure 2:
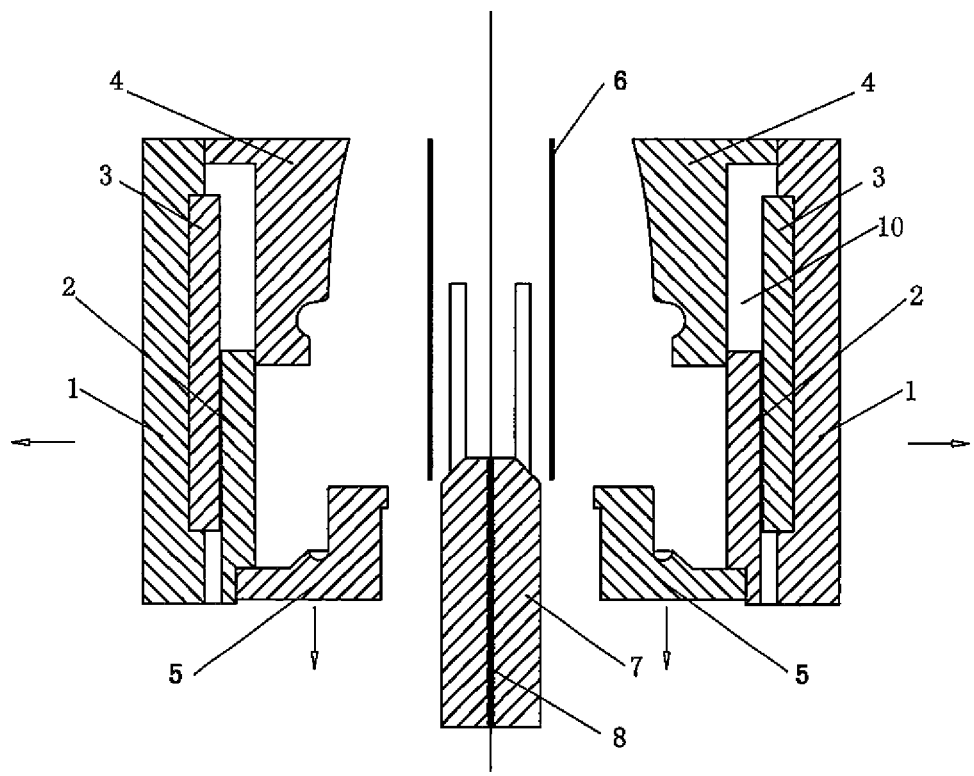
FIG. 2 illustrates a mold opened state of the present patent application.

FIG. 2 illustrates the structure of the mold according to the present patent application. The mold includes a flower pot cavity template 4, a container opening pulling mold 7, and the opening flanged pulling plates 5. A blowing tube 8 is disposed in the container opening pulling mold 7. The mold further includes a fixing plate 1 configured for fixing the mold onto the clamping sets, a guiding block 3 configured for guiding the opening flanged pulling plate 5 and the blocking plate 2, and the blocking plate 2 configured for blocking the plastics. A sliding track 10 is formed on the flower pot cavity template 4 and configured for allowing the blocking plate to move back and forth. The sliding track 10 is disposed at the inner side of the guiding block 3. The blocking plate 2 is in contact with the inner side wall of the guiding block 3 and can be inserted into the sliding track 10 and slide along the sliding track 10. The opening flanged pulling plate 5 is fixedly connected to an outer side of the blocking plate 2. The container opening pulling mold 7 is disposed between the two opening flanged pulling plates 5. The upper opening of the cavity template 4 and the opening flanged pulling plates 5 work together to form the mold cavity of the flanged handle of the flower pot.

A protrusion 6 with the same length as the depth of the container is disposed at the front end of the container opening pulling mold 7. This protrusion can function to limit the procession of the container opening pulling mold, and prevent the flanged handle from being cut off due to excessive procession when the opening flanged pulling plates and the container cavity template are closed. The protrusions are a pair of pole shaped rods.

The protrusion may also be a hollow cylinder. When the pressure in the blowing tube is decreased, a negative pressure is formed in the cavity of the flower pot so that the flower pot is sucked at the front end of the cylinder, which prevents the flower pot from falling off from the container opening pulling mold when the mold is opened.

Figure 3:
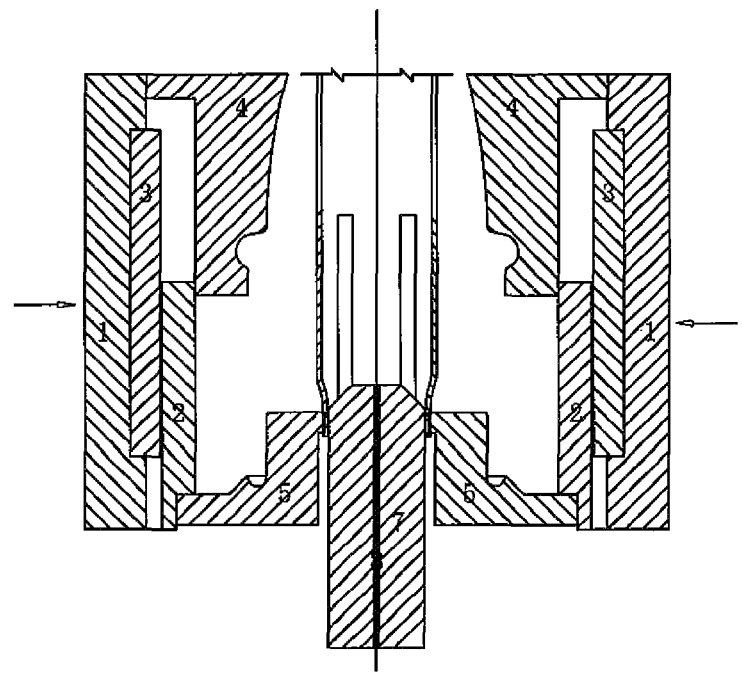
FIG. 3 illustrates a mold closed state.
Figure 4:
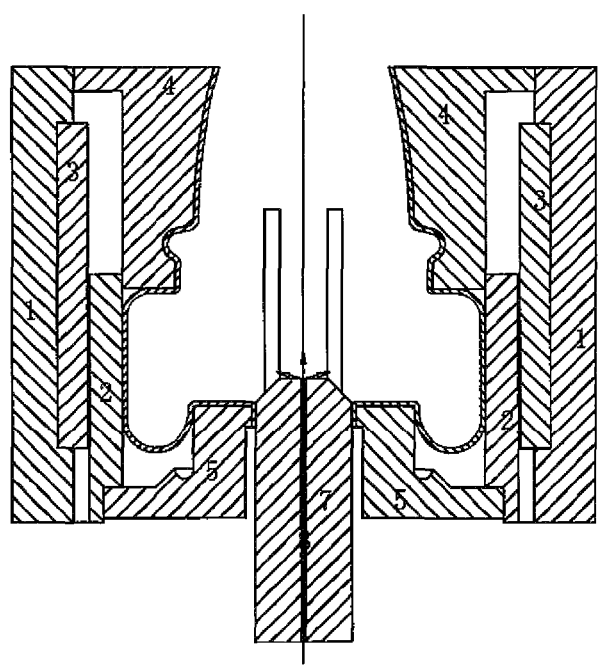
FIG. 4 illustrates a state of blowing air.
Figure 5:
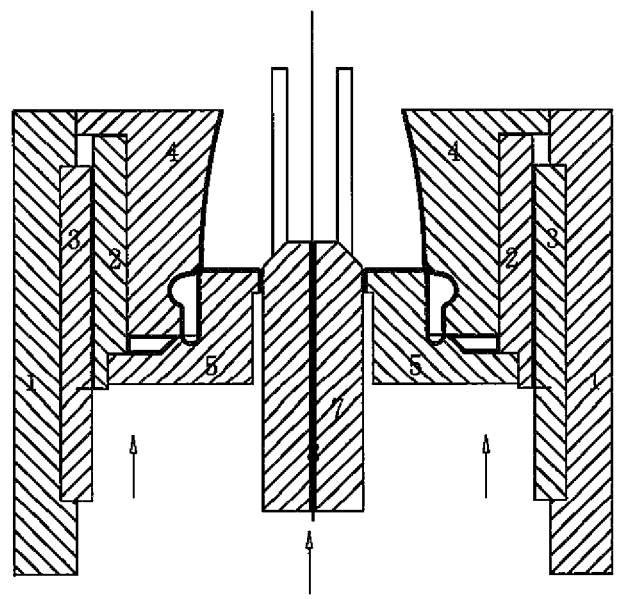
FIG. 5 illustrates a state of the mold being closed and the resin being pushed.
Figure 6:
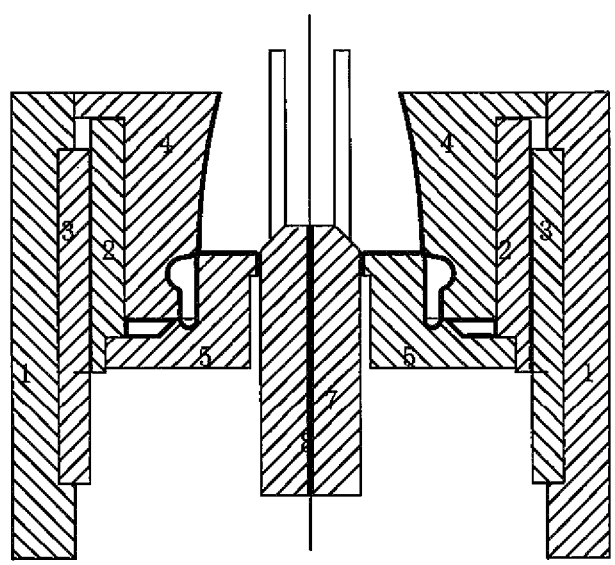
FIG. 6 illustrates a completed stage of the blow molding.
Figure 7:
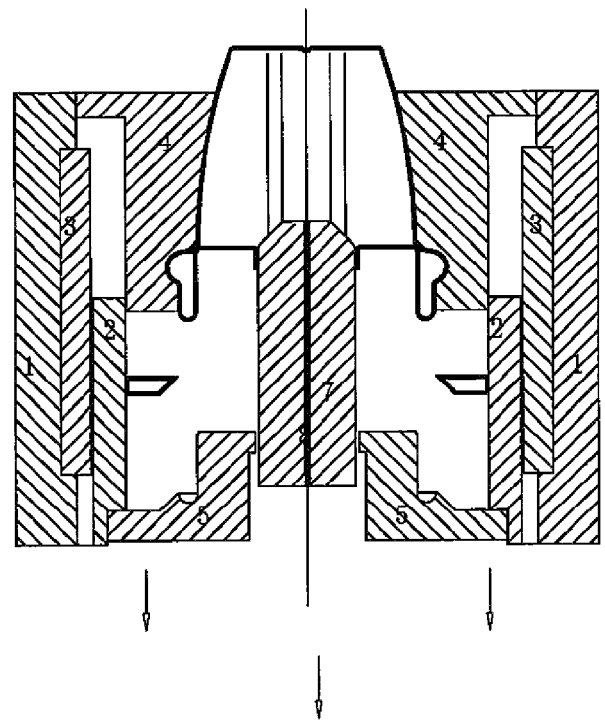
FIG. 7 illustrates a mold opened state.
Figure 8:
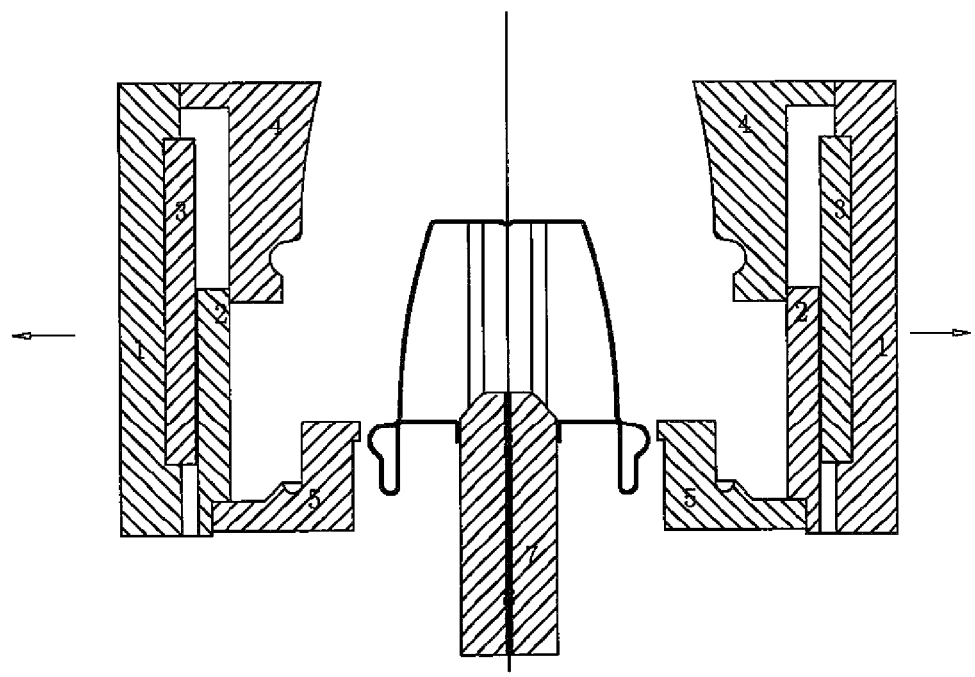
FIG. 8 illustrates another mold opened state.

FIGS. 2-8 illustrate the operation process of the present patent application. When the mold is opened, as illustrated by FIG. 2, a cylinder shaped material base 6 is put in, covering the front end of the container opening pulling mold. Then the mold is closed, as illustrated by FIG. 3. The fixing plate 1, the blocking plate 2, the guiding block 3, the container cavity template 4, and the opening flanged pulling plates 5 simultaneously move in a horizontal direction toward the container opening pulling mold 7 (temporarily being hold still). At this moment, the air is not blown. Then the blowing procedure is performed, as illustrated by FIG. 4. The blocking plate 2, the opening flanged pulling plates 5 and the container opening pulling mold 7 start to move up and at the same time air is started to be blown through the blowing tube 8. Then the mold is closed and pushed, referring to FIG. 5. The opening flanged pulling plates 5 and the container opening pulling mold 7 continue to move up till reaching a stopping position so that the flanged portion is formed. The excessive left over material is cut off and the air continues to be blown through the blowing tube. The next step is blow molding as illustrated in FIG. 6. The opening flanged pulling plates 5 and the container opening pulling mold 7 stop moving up and the air continues to be blown through the blowing tube. Then the mold is opened, as illustrated by FIG. 7. The blowing tube stops blowing air. The blocking plate 2 and the opening flanged pulling plates 5 simultaneously move down till they are disengaged from the opening of the product. Till the whole mold restores to the mold opened state, as illustrated by FIG. 8, the fixing plate 1, the blocking plate 2, the guiding block 3, the container cavity template 4, and the opening flanged pulling plates 5 simultaneously start to move toward the outside, in a horizontal direction along with the clamping sets. Then the mold is opened and the product is taken out.

What is claimed is:

1. A flower pot mold for blow molding comprising:
   a flower pot cavity template;
   a container opening pulling mold;
   a plurality of opening flanged pulling plates, a blowing tube being disposed in the container opening pulling mold;
   a fixing plate configured for fixing the mold onto a clamping set;
   a guiding block configured for guiding the opening flanged pulling plate and a blocking plate; and
   the blocking plate configured for blocking the plastics; wherein:
   a sliding track is formed on the flower pot cavity template and configured for allowing the blocking plate to move back and forth, the sliding track is disposed at an inner side of the guiding block, the blocking plate is in contact with the inner side wall of the guiding block and can be inserted into the sliding track and slide along the sliding track, the opening flanged pulling plate is fixedly connected to an outer side of the blocking plate, the container opening pulling mold is disposed between the two opening flanged pulling plates;
   wherein the guiding block and the fixing plate are connected into one piece,
   wherein a protrusion with the same length as the depth of the container is disposed at the front end of the container opening pulling mold, the protrusion is a pair of pole shaped rods or a hollow cylinder;
   wherein the upper opening of the container cavity template and the opening flanged pulling plates work together to form a mold cavity of a flanged handle of a flower pot.

2. A flower pot mold for blow molding comprising:
   a flower pot cavity template;
   a container opening pulling mold;
   a plurality of opening flanged pulling plates, a blowing tube being disposed in the container opening pulling mold;
   a fixing plate configured for fixing the mold onto a clamping set;
   a guiding block configured for guiding the opening flanged pulling plate and a blocking plate; and
   the blocking plate configured for blocking the plastics; wherein:
   a sliding track is formed on the flower pot cavity template and configured for allowing the blocking plate to move back and forth, the sliding track is disposed at an inner side of the guiding block, the blocking plate is in contact with the inner side wall of the guiding block and can be inserted into the sliding track and slide along the sliding track, the opening flanged pulling plate is fixedly connected to an outer side of the blocking plate, the container opening pulling mold is disposed between the two opening flanged pulling plates.

3. The flower pot mold for blow molding of claim 2, wherein the guiding block and the fixing plate are connected into one piece.

4. The flower pot mold for blow molding of claim 2, wherein a protrusion with the same length as the depth of the container is disposed at the front end of the container opening pulling mold.

5. The flower pot mold for blow molding of claim 4, the protrusion is a pair of pole shaped rods.

6. The flower pot mold for blow molding of claim 4, wherein the protrusion is a hollow cylinder.

7. The flower pot mold for blow molding of claim 2, wherein the upper opening of the container cavity template and the opening flanged pulling plates work together to form a mold cavity of a flanged handle of a flower pot.

* * * * *